United States Patent [19]

Maeda et al.

[11] Patent Number: 4,573,089
[45] Date of Patent: Feb. 25, 1986

[54] RECORDING AND REPRODUCING APPARATUS

[75] Inventors: Masaya Maeda; Noritsugu Hirata; Hiroyuki Takimoto, all of Kanagawa, Japan

[73] Assignee: Canon Kabushiki Kaisha, Tokyo, Japan

[21] Appl. No.: 503,635

[22] Filed: Jun. 13, 1983

[30] Foreign Application Priority Data

Jun. 14, 1982 [JP] Japan .................................. 57-102590

[51] Int. Cl.³ .......................... G11B 5/52; G11B 5/56
[52] U.S. Cl. ...................................... 360/77; 360/70
[58] Field of Search ................... 360/10.2, 70, 77, 78

[56] References Cited

U.S. PATENT DOCUMENTS

| 3,829,892 | 8/1974 | Nagahiro et al. | 360/73 |
| 4,048,660 | 9/1977 | Dennison et al. | 360/77 |
| 4,148,082 | 4/1979 | Okada et al. | 360/77 |
| 4,237,500 | 12/1980 | Sanderson | 360/77 |
| 4,297,733 | 10/1981 | Sanderson | 360/77 |

Primary Examiner—George G. Stellar
Attorney, Agent, or Firm—Toren, McGeady, Stanger, Goldberg, & Kiel

[57] ABSTRACT

A recording and reproducing apparatus in which an information signal is recorded in the first area of a track on a recording medium, a pilot signal is recorded in the second area for tracking control. When a reproducing head is on the second area, tracking by a reproducing head in the first area is controlled by the pilot signal reproduced by the reproducing head.

19 Claims, 24 Drawing Figures

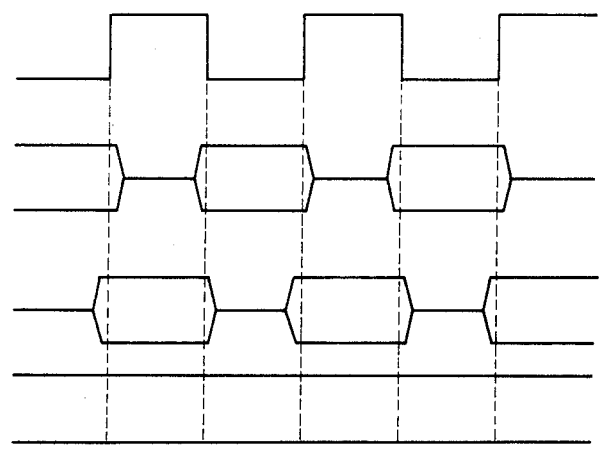
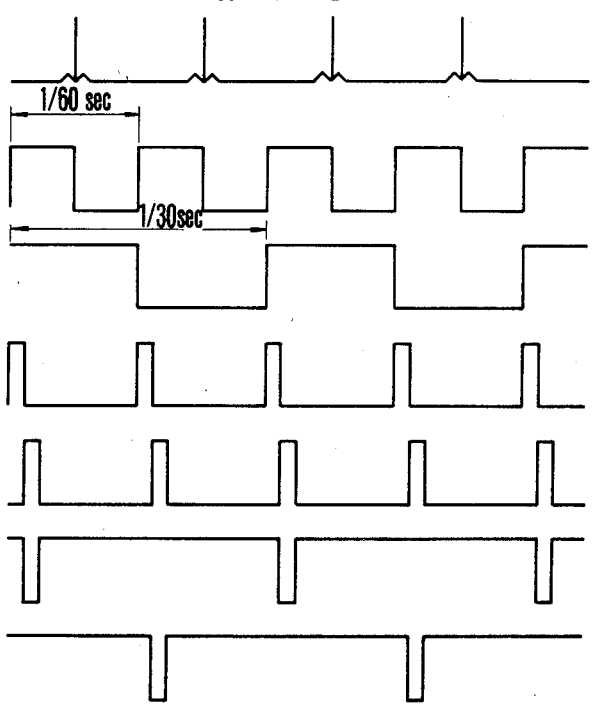

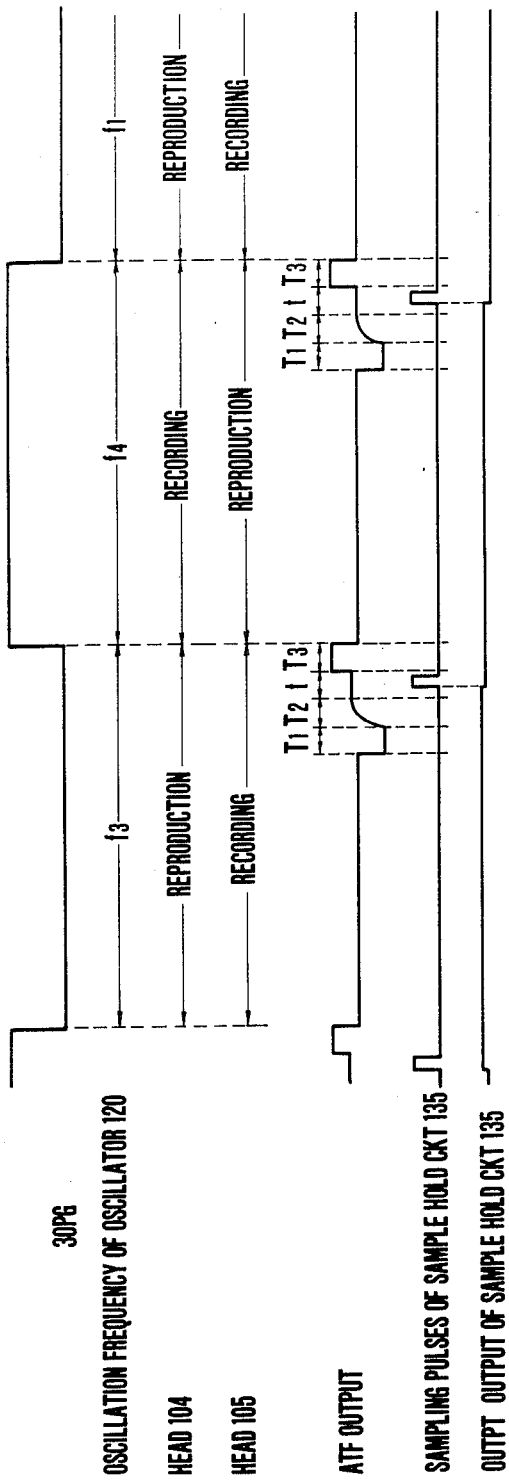

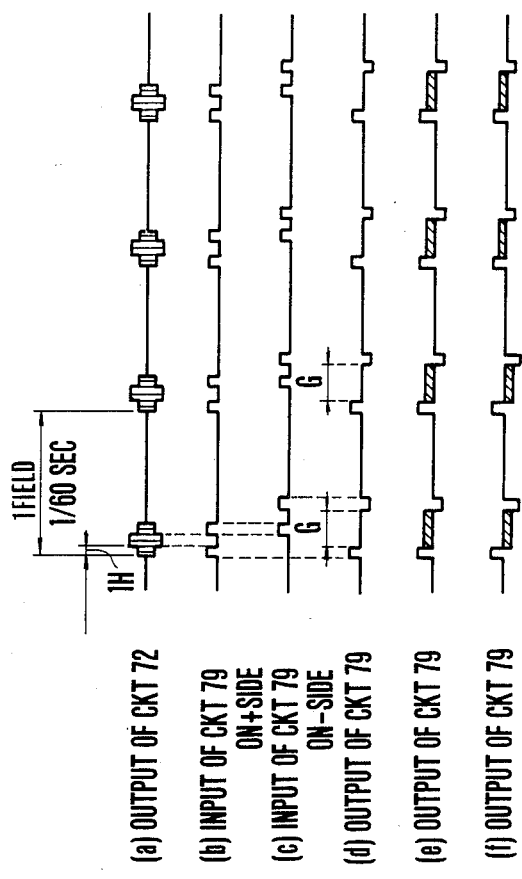

RECORDING AND REPRODUCING APPARATUS

BACKGROUND OF THE INVENTION

1. Field of the Invention

This invention relates to an apparatus for recording and reproducing an information signal and more particularly to a recording and reproducing apparatus including a tracking control device which enables a recording or reproducing head to accurately trace a recording track in which the information signal is recorded on the recording medium.

2. Description of the Prior Art

Generally a magnetic recording and reproducing apparatus of the class adapted for recording and reproduction of television signals (hereinafter called a VTR) is arranged to have video signals, etc. recorded and reproduced in and from tracks one after another with a rotary head scanning the magnetic surface of a recording tape askew at a given angle to the travelling direction of the tape.

In a two-head helical scanning type VTR, for example, tracks are formed in sequence, one track for each field as shown in FIG. 1 of the accompanying drawings. Further, while video signals are recorded in these oblique tracks, a control signal (hereinafter called the CTL signal) which is a reference signal for enabling these recording tracks to be accurately traced at the time of reproduction is recorded for every two fields, or for every frame, in a control track 2 (hereinafter called the CTL track) which is provided along one edge of a magnetic recording tape 1.

At the time of reproduction, therefore, two rotary heads accurately trace recorded tracks if capstan, etc. which are arranged to cause the magnetic tape to travel are controlled in such a way as to have the CTL signal reproduced at a predetermined phase relative to the rotation of the rotary heads.

Further, in the conventional insertive recording method, tape travel is controlled such that the CTL signal which has already been recorded is reproduced at a given phase relative to the rotary head rotating in synchronism with a video signal to be inserted, so that the above-stated video signal can be recorded while tracking control is being accomplished in the same manner as in reproduction. This ensures unimpaired continuity of the tracks even before and after an inserted scene or at a changing part from one scene to another, so that no vacillation will take place in a reproduced picture.

Various methods have been proposed with respect to insertive editing. The details of these editing methods are well known and therefore are omitted from description herein.

Home VTR technology has conspicuously advanced during recent years. Further, proposals have been made for various systems which are arranged to permit reduction in size of such VTR's or improvement in their recording density by superposing a pilot signal on a track to be scanned by a rotary head and by performing tracking control with the signal at the time of reproduction, so that a CTL track 2 or a CTL signal recording and reproducing head can be dispensed with.

An aural signal recording track 3 has conventionally been provided along an edge of the tape 1 on the side opposite to the CTL track 2. A system has been proposed which dispenses with a stationary aural signal recording head by FM modulating the aural signal and by recording it with a rotary head superposed on a video signal.

Such an apparatus that has no stationary head is, however, not desirable for the above-stated insertive recording as it requires additional provision of a CTL head for insertive recording.

SUMMARY OF THE INVENTION

It is an object of the present invention to provide a recording and reproducing apparatus which is arranged to accomplish tracking control for insertive recording or for ordinary reproduction by reproducing a pilot signal recorded in a part of a recording medium other than a part in which an information signal is recorded.

It is another object of the invention to provide a recording and reproducing apparatus wherein tracking control is accomplished for insertive recording or for ordinary reproduction by reproducing a pilot signal at a part called an overlapped portion of a magnetic recording tape which is a part of the tape where the tape is at an angle $(\theta - \alpha)°$ to a tape guiding cylindrical drum assuming that a magnetic tape winding angle on the tape guiding cylindrical drum is $\theta°$ and an angle required for recording a portion of a video signal for one field or for one frame is $\alpha°$.

These and further objects and features of the invention will become apparent from the following detailed description of preferred embodiments thereof taken in connection with the accompanying drawings.

BRIEF DESCRIPTION OF THE DRAWINGS

FIG. 4, (a)–(d), is a timing chart showing the timing of outputs of essential circuits of the circuit arrangement shown in FIG. 3 when the embodiment is in a reproduction mode.

FIG. 5, (a)–(g), is a timing chart showing the timing of the outputs of essential circuits of the circuit arrangement of FIG. 3 when the embodiment is in an insertive recording mode.

FIG. 9 is a timing chart showing the timing of operation of a second embodiment when the embodiment is in an insertive recording mode.

FIG. 14 is a timing chart showing the timing of the outputs of essential circuits of the circuit arrangement shown in FIG. 13.

DETAILED DESCRIPTION OF THE PREFERRED EMBODIMENTS

The method of tracking by means of a pilot signal employed in the following specific embodiment of the present invention follows a method proposed by Philips Co. of the Netherlands as disclosed in the specification of U.S. Pat. No. 4,297,733. However, this invention is not limited to such a pilot signal method.

Figure 1:
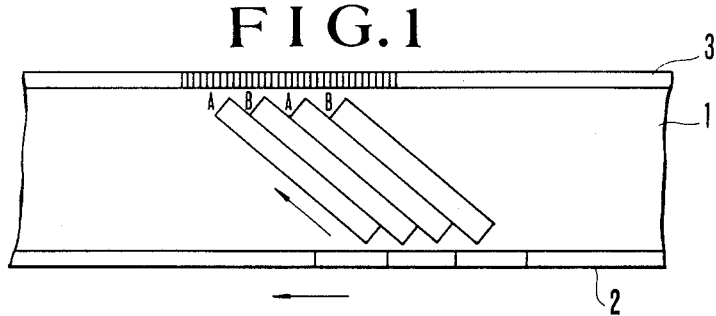
FIG. 1 is a schematic illustration of the recording pattern of the conventional recording tape.
Figure 2A:
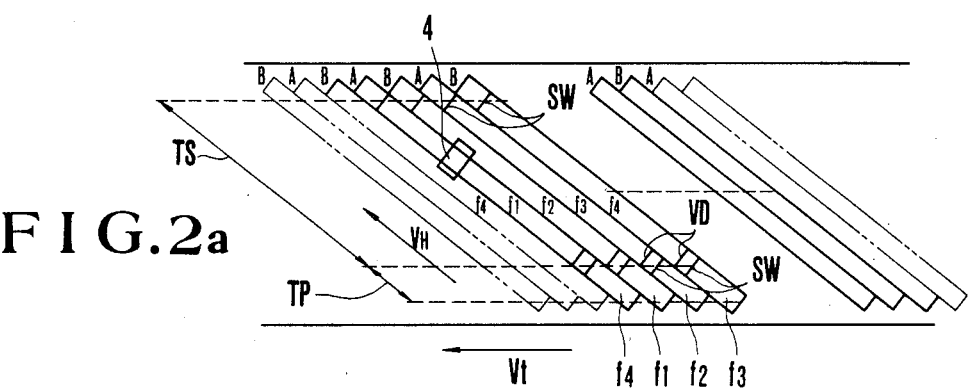
FIG. 2a is an illustration schematically showing a recording pattern on a recording tape according to a first embodiment of the present invention.

In FIG. 2a, which shows a tape magnetizing pattern to be obtained during an insertive recording operation, full lines indicate the inserted state of insertive recording signals while tracks of an existing record are indicated by two-dot chain lines. Each track includes an area TS which is to be used for obtaining a necessary picture signal while the remaining area TP corresponds to the above-stated overlapped portion.

Figure 2B:
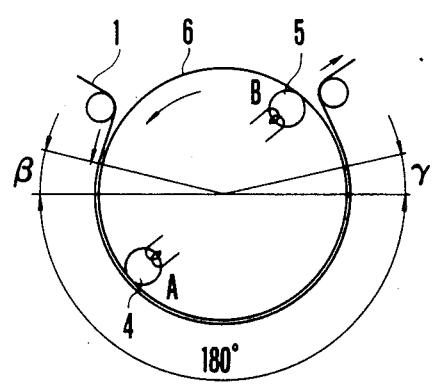
FIG. 2b is an illustration schematically showing the recording and reproducing arrangement (including a drum and heads) of the first embodiment.

FIG. 2b shows a cylindrical guide drum 6 with a magnetic recording tape 1 brought into contact therewith. Rotary heads 4 and 5 are incorporated into the guide drum 6.

Figure 3:
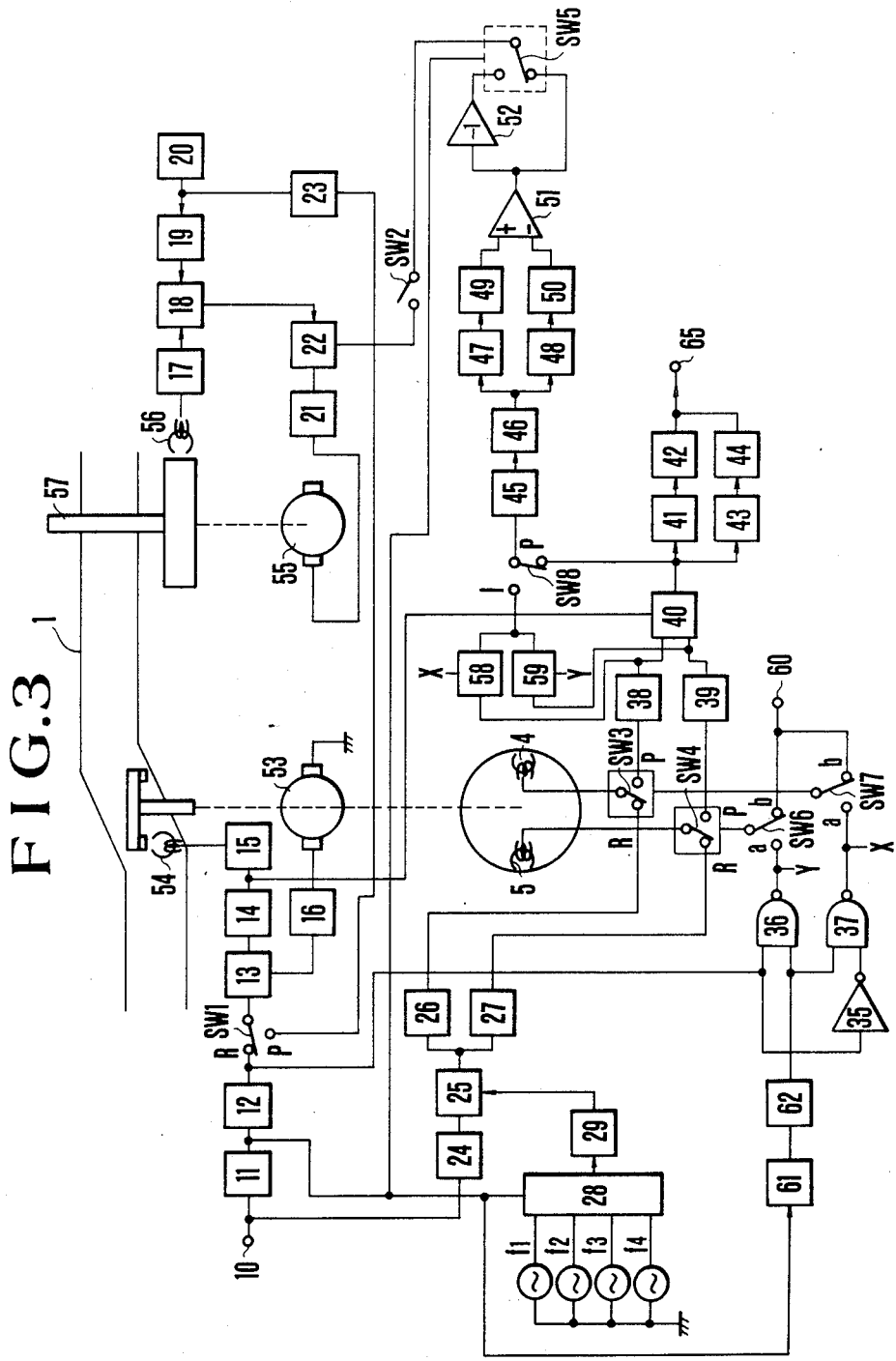
FIG. 3 is a circuit block diagram showing the electrical circuit arrangement of the first embodiment of the invention.

In FIG. 3, the pilot signal recording and reproducing operations occur as follows: First, in an ordinary recording mode, a video signal supplied to an input terminal 10 is synchronously separated at a synchronizing separation circuit 11. Then, the circuit 11 produces a square wave of 50% duty ratio which is synchronized with a vertical synchronizing signal (60 Hz). In this embodiment, the NTSC system of field frequency of 60 Hz and frame frequency of 30 Hz is employed. The pulses produced from the circuit 11 is further frequency divided into ½ through a frequency divider 12 and then is supplied to one of the input terminals of a phase comparator 13 through a switch SW1 which is connected to its terminal R during a recording operation. Meanwhile, the rotation phase of the rotary head is detected by a detector 54. A flip-flop is triggered by two monostable multivibrators. In FIG. 4, a signal (a) obtained through a block 15 which is arranged to produce a square wave of 30 Hz is shaped into a keystone shape wave or a trapezoid by a wave shape 14 and is supplied to the other input terminal of the above-stated phase comparator 13 to be phase compared with a signal from the frequency divider 12 which has been frequency divided by the frequency divider 12. As a result of this phase comparison, an error voltage corresponding to a phase difference is obtained.

The rotation phase of the rotary head is synchronized with the vertical synchronizing signal of the aforementioned recording video signal by applying the above-stated error voltage to a drum motor drive amplifier 16.

Meanwhile, a control system for a capstan 57 is arranged such that, during recording, the output of a rotation detector (FG) 56 is supplied to a speed comparator 18 through an FG amplifier 17; this signal is compared with a signal obtained by frequency dividing a signal produced from a reference oscillation block 20; and constant speed control is accomplished through this comparison.

The 60 Hz output (the vertical synchronizing signal) of the synchronizing separation block 11 is supplied to a ring counter block 28 which counts the ring circulating in a 4 count manner. Pilot frequency signals f1, f2, f3 and f4 which are thus supplied to the block 28 are gated at every one count. A mixer 25 superposes each of the pilot frequency signals f1–f4 on every field of a recording signal produced from a recording process circuit 24. The superposed signal is caused by recording amplifiers 26 and 27 to be recorded on a magnetic recording tape through the rotary heads 4 and 5. In this instance, the frequencies or pilot signals f1–f4 are arranged to satisfy a condition of $f2-f1=f3-f4=f5$, $f4-f1=f3-f2=f6$, $f5 \neq f6$. Further, as shown in FIG. 2a, field tracks of odd numbers (tracks A as indicated in the drawing) and field tracks of even numbers (tracks B) are arranged to have the pilot signals f1 and f3 and f2 and f4 respectively.

The recording signal having these pilot signals superposed thereon is normally reproduced in the following manner: At the time of reproduction, the oscillation frequency of a reference signal oscillation block 20 (see FIG. 3) which is composed of a crystal oscillator, etc. is frequency divided by a block 23 into a square wave of 30 Hz. The rotation phase of the rotary head is synchronized with the 30 Hz in the same manner as in recording.

The speed of the capstan is controlled by a discrete servo system in the same manner as in recording. To this capstan speed control is added tracking phase control which is accomplished in a manner to be described later herein.

Rotary heads A and B are arranged to scan the surface of a magnetic tape. Switches SW3 and SW4 are shifted to their sides P for reproduction. Reproduced RF signals which are as represented by parts (b) and (c) in FIG. 4 are produced from reproduction amplifiers 38 and 39 through the switches SW3 and SW4 respectively. A block 15 produces a square wave signal of 30 Hz (hereinafter will be called the SW pulses) in synchronism with the rotation phase of the rotary heads. A switching circuit 40 is arranged to alternately switch the inputs thereof with the SW pulses. The outputs of the reproduction amplifiers 38 and 39 are supplied through the switching circuit 40 to a reproducing process block consisting of elements 41–44 according to the rotary head on the scanning side. A reproduced video signal is obtained from a terminal 65. The output of the circuit 40 is as shown at a part (d) of FIG. 4. In FIG. 4, the parts (a)–(d) of the timing chart respectively represent the wave forms of the outputs of the circuit blocks 15, 38, 39 and 40 of FIG. 3.

During ordinary reproduction, a tracking servo arrangement operates as follows: As has been mentioned in the foregoing, each field, that is, each track has one of the pilot frequency signals f1–f4 serially switched and superposed on the video signal. These frequency signals are preferably arranged to be of low frequency such as 100–200 KHz or thereabout in such a way as to have the pilot signal detectable as a cross-talk component from each adjoining track even in the case of a VTR of the azimuth recording system. When the rotary head is scanning the track A in which the frequency signal f1 is recorded, the reproduced RF signal produced from the switching circuit 40 includes the frequency signal f4 reproduced as a cross-talk component from an adjoining track on the front side and the frequency signal f2 reproduced also as a cross-talk component from another adjoining track on the rear side of the track A. The signal containing these cross-talk components is processed to remove a high frequency component such as a video signal or the like through a low-pass filter 45 which is arranged to pass a low frequency component such as the pilot signal frequency. After that, the signal containing these cross-talk components is amplified by an amplifier 46. Band-pass filters 47 and 48 have the above-stated frequencies f5 and f6 as their central frequencies. The band-pass filters 47 and 48 are arranged to pass beat components between the pilot signal f1 reproduced from the track being scanned and the cross-talk components f4 and f2 from the front and rear adjoining tracks, that is, frequency differences f2−f1=f5 and f4−f1=f6 are allowed to pass. Reference numerals 49 and 50 indicate amplitude detectors for detecting the amplitude of these frequencies f5 and f6. The amplitude detectors 49 and 50 convert the detected amplitudes into voltages. The outputs of these amplitude detectors 49 and 50 are supplied to a differential amplifier 51, which then produces a voltage corresponding to a difference between the outputs of the detectors 49 and 50. This error output is switched over from one field to another and is produced at every other field through a switch SW5 to a switch SW3 alternately with a signal of an opposite polarity which has passed through an inverter 52. The error signal which is thus inverted at every field is transmitted through a switch SW2 which closes at the time of reproduction and insertive recording. The error signal is then mixed at a mixer 22 as a tracking phase error signal with an error signal of the capstan speed control system. The mixed signal thus obtained is supplied to a driving amplifier 21 provided for a capstan motor 55. The capstan motor 55 is controlled according to the mixed error signal.

If the rotary head A (4) which is scanning the track A having the frequency signal f1 deviates from its path toward the rear adjoining track having the frequency signal f2 recorded therein, (hereinafter the tracking deviation to this side will be called right deviation and deviation to the opposite side left deviation), the beat component f5 (=f2−f1) increases while another beat component f6 (=f4−f1) decreases. Then, the differential amplifier 51 produces an error signal which is in a positive direction. At that instant, since the switch SW3 has been shifted to the direction shown in FIG. 3, the positive error signal is allowed to be produced as it is. Further, when the rotary head B (5) performs a reproducing operation on the track B in which the frequency signal f2 is recorded, the relation of the right and left deviations and the beat components f5 and f6 becomes reverse to that of the preceding field. However, since the polarity of the error signal is inverted by switching the switch SW5 for every field, this presents no problem. The relation between these things also remains the same for scanning the tracks having the frequency signals f3 and f4 recorded therein.

In this embodiment of the invention, insertive recording is accomplished in the following manner: In insertive recording, an additional video signal is recorded over recorded tracks without actuating a total width erasing head as has been mentioned in the foregoing. In other words, a scene to be over-written is inserted by an insertive recording operation. Mere arrangement to record an inserting signal would result in deviation from the existing recording tracks and the continuity of the tracks would be lost at a part between an originally recorded scene and the scene to be inserted. This would disturb a picture reproduced.

To solve this problem the present invention provides a novel method wherein the rotary head is brought into a reproducing mode at an overlapping portion TP of the tape during insertive recording. Then, the pilot signal is reproduced to carry out tracking control for the recording tracks with the reproduced pilot signal used during the insertive recording.

The switches SW6 and SW7 are shifted to their connecting sides a in the insertive recording mode. In the tracking control in the ordinary recording and reproducing modes, the rotary heads A (4) and B (5) are switched between the recording mode (R side) and the reproducing mode (P side) by means of an input signal of a mode signal input terminal 60. This is changed to be accomplished with the output terminals of NAND gates 36 and 37 in the insertive recording mode.

An insertive recording signal is supplied from an input terminal 10 to cause the drum motor 53 to rotate in synchronism with the synchronizing signal included in the signal in the same manner as in ordinary recording. Referring to FIG. 5, a vertical synchronizing signal (a) is synchronously separated by a synchronizing separation circuit 11 from the above-stated insertive recording signal which is a video signal. The synchronizing separation circuit 11 then produces a square wave of 60 Hz (b). A monostable multivibrator circuit 61 is triggered at the rise of this 60 Hz square wave. Another monostable multivibrator circuit 62 is triggered at the fall of the output (d) of the monostable multivibrator circuit 61. The pulses (d) produced by the circuit 61 is located in timing within an overlapped portion β in timing at the drum entrance as shown in FIG. 2b. The pulse width of the pulses is several H, which represents a horizontal scanning period.

The output of the monostable multivibrator circuit 62 is supplied to the NAND gates 36 and 37 together with a square wave of 30 Hz (c) (FIG. 5) which is obtained through the frequency divider 12 with the output of the above-stated synchronizing separation circuit 11 frequency divided into ½ and also together with a signal which is obtained by inverting the square wave (c) by means of an inverter 35. When the levels of the outputs (f) and (g) of the NAND gates 36 and 37 are high, the switches SW3 and SW4 are shifted to their R sides. These switches are shifted to the P sides when the output levels of the NAND gates are low. Further, these outputs are supplied to the gate circuits 58 and 59 for the reproduction RF signal. While they are at low levels, the reproduction RF signal is allowed to pass these gate circuits and is produced on the side of a switch SW8. During the insertive recording operation, the switch SW8 is shifted to its side I.

Such being the arrangement, the pilot signal can be reproduced and the above-stated tracking control can be accomplished during the period of several H at the overlapped portion (for the remaining area TP). Further, it is preferable to hold the error output signal for a period of about 1/60 sec during the above-stated inserting period, because sampling for the tracking control becomes 60 Hz.

The tracking control differs from the control method for ordinary reproduction only in respect of whether sampling is to be accomplished continuously or intermittently and, therefore, does not require detailed description thereof.

Figure 6:
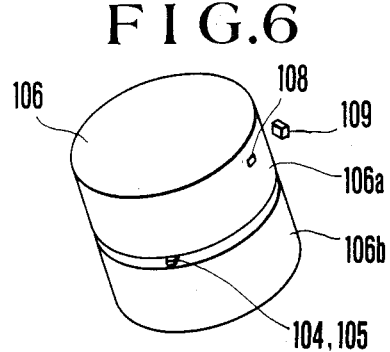
FIG. 6 is an oblique view showing the structural arrangement of the tape guide drum for detecting the rotation phase of the drum.

While the tape winding angle of the tape portion from which the video signal is to be reproduced is 180°, the tape winding angle of the overlapped portion is generally about 5°. Hence, a reproduced signal from this part tends to become unstable. Therefore, during insertive recording, the overlapping angle on the side from which the pilot signal is to be reproduced is preferably arranged to be at least 10°. More specifically, the track length of the overlapped portion is preferably arranged to be at least 5% of the track length of the video signal area. Another embodiment example of the invention which eliminates the instability of a signal reproduced from the overlapped portion is arranged as described as a second embodiment example below:

FIGS. 6–11 illustrate the second embodiment as an example of the invention. FIG. 6 shows a method for detecting the rotation phases of rotary heads 104 and 105. A magnet 108 is mounted on an upper rotary drum 106a on which the recording and reproducing video heads 104 and 105 are mounted. Meanwhile, a hole element 109 is fixedly positioned opposite to the magnet 108. The hole element 109 is thus arranged to produce an output every time the upper drum 106a makes one turn. The output of the hole element 109 is converted, for example, into a signal 30 PG which is in a square wave form of 30 Hz.

Figure 8:
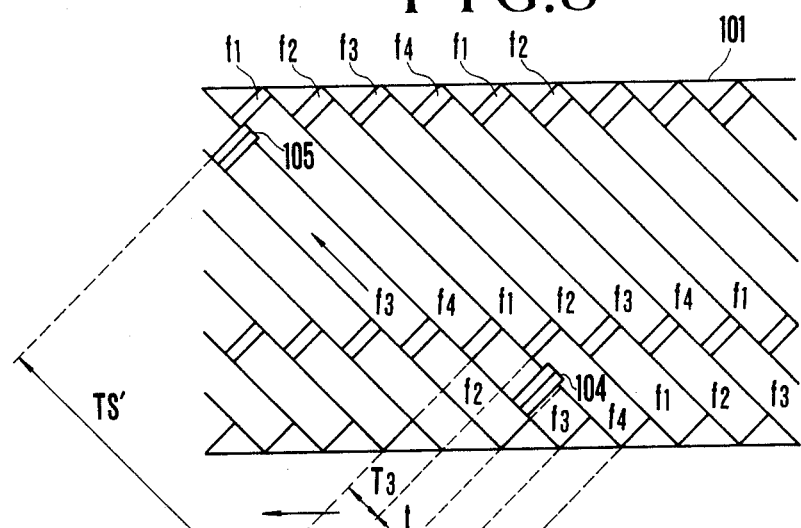
FIG. 8 is a schematic illustration of a recording pattern on a video tape.
Figure 7:
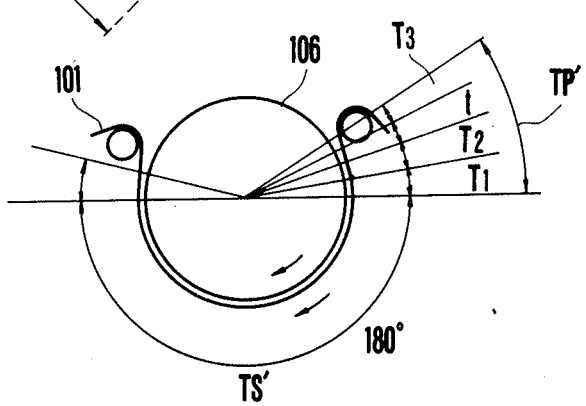
FIG. 7 is an illustration schematically showing the relative positions of a video tape and the drum.
Figure 10:
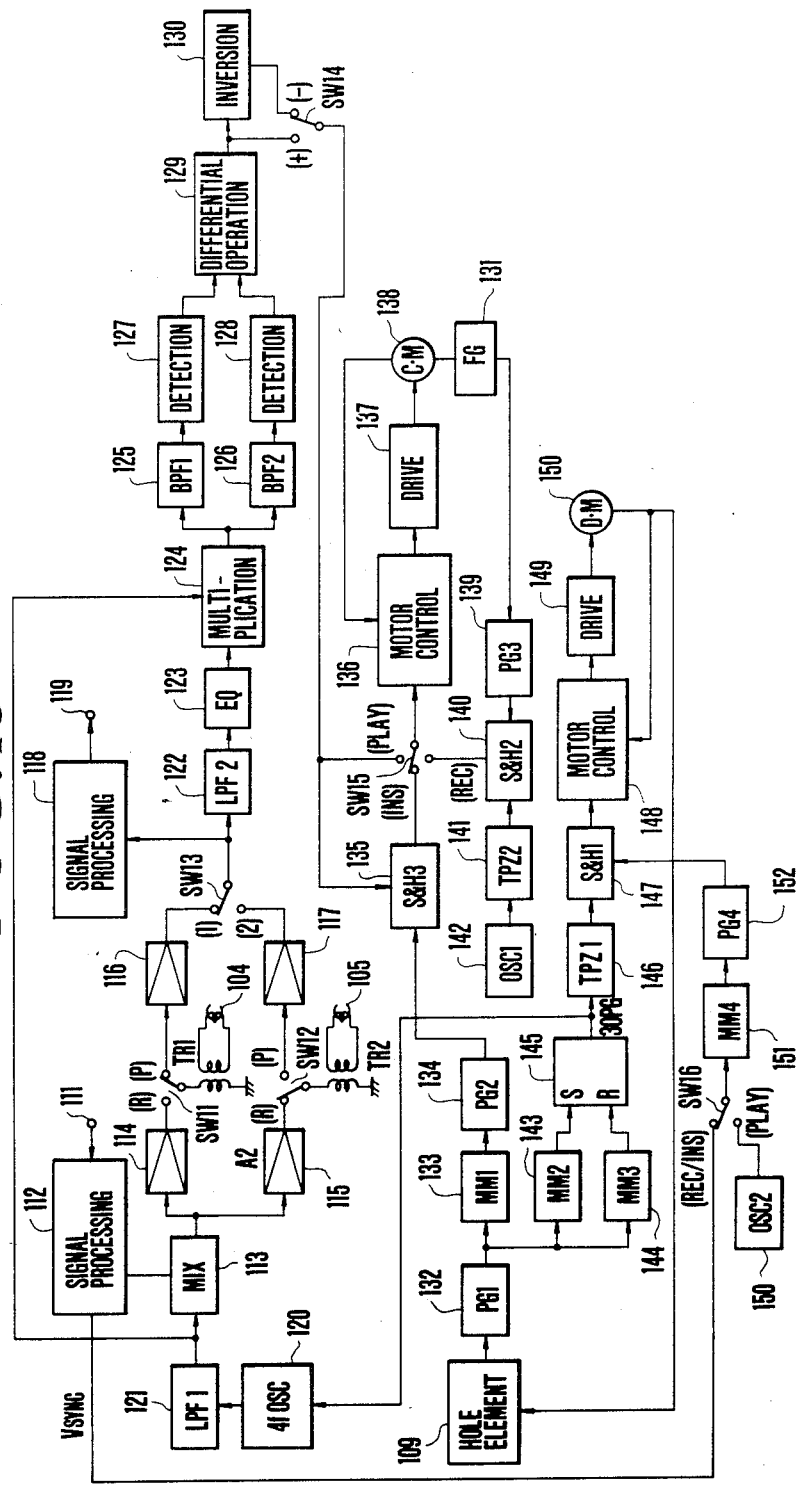
FIG. 10 is a circuit block diagram showing the control circuit arrangement of the second embodiment.

FIG. 7 shows the relative positions of the video heads and a video recording tape. FIG. 8 shows a recording pattern on the video tape. FIG. 9 is a timing chart showing the timing for producing tracking control signals during insertive recording. FIG. 10 shows a control block diagram of the magnetic recording and reproducing apparatus according to the embodiment example of the invention. The connection states of the switches SW11–SW16 are shown in a condition where the above-stated signal 30 PG is at a low level (hereinafter will be called L). The recording operation or reproducing operation is performed by the video head 104 when the signal 30 PG is at a high level (hereinafter called H) and by the other video head 105 when the signal 30 PG is at L.

The connection states of the switches SW11–SW16 of FIG. 10 are as listed in the following table. In the table, the mark * indicates that the switch connection state changes for every other field.

portions of the video signal in the recording tacks one after another according to the signal 30 PG which will further be described later herein. In this instance, the frequency signal f1′ = 100 KHz, the signal f2′ = 115 KHz, the signal f3′ = 160 KHz and the signal f4′ = 145 KHz.

The output of the mixing circuit 113 is supplied to recording amplifiers 114 and 115. The switches SW11 and SW12 are connected to their terminal R sides irrespective as to whether the level of the signal 30 PG is H or L. This permits a recording current to flow through the transistors TR1 and TR2 to the video recording heads 104 and 105. A recording pattern is formed on the video recording tape 101 as shown in FIG. 8. The video recording tape 101 is wound on the cylindrical drum 106 at least at an angle necessary for recording the video signal (180° in this specific embodiment). Since the same recording current is flowing to both the rotary heads 104 and 105, the same portion of the video signal and the same portion of a pilot signal that are recorded at the end of a video recording track TS′ are also recorded in the overlapped portion TP′ of the next track.

Accordingly, the frequency of the recorded pilot signal in the overlapped portion of one track differs from the frequency of the recorded pilot signal in the video track TS′. A drum motor 150 is phase controlled jointly by the output of the hole element 109 and the vertical synchronizing signal $V_{SYNC}$ extracted from the input video signal. More specifically, the signal produced from the hole element 109 is processed to have its wave form shaped by a wave form shaping circuit PG1 and is supplied to two monostable multivibrators 143 and 144. The monostable multivibrators 143 and 144 are arranged to adjust the mounting error of the magnet 108 on the cylindrical drum 106, the phase errors of the hole element 109 and the video heads 104 and 105 and the time lag of the wave form shaping circuit 132, etc. The outputs of the monostable multivibrators 143 and 144 are respectively arranged to set and reset a flip-flop 145. When the heads 104 and 105 which are opposed to each other at an angle of 180° are at the two ends of the video track TS′, the output of the flip-flop 145 is inverted.

|                      | SW11 | SW12 | SW13 | SW14 | SW15     | SW16       |
|----------------------|------|------|------|------|----------|------------|
| Ordinary recording mode: |      |      |      |      |          |            |
| 30 PG is at H:       | (R)  | (R)  | *    | *    | (REC)    | (REC/INS)  |
| 30 PG is at L:       | (R)  | (R)  | *    | *    | (REC)    | (REC/INS)  |
| Reproduction mode:   |      |      |      |      |          |            |
| 30 PG is at H:       | (P)  | (P)  | (1)  | (+)  | (PLAY)   | (PLAY)     |
| 30 PG is at L:       | (P)  | (P)  | (2)  | (−)  | (PLAY)   | (PLAY)     |
| Inserting mode:      |      |      |      |      |          |            |
| 30 PG is at H:       | (R)  | (P)  | (2)  | (+)  | (INS)    | (REC/INS)  |
| 30 PG is at L:       | (P)  | (R)  | (1)  | (−)  | (INS)    | (REC/INS)  |

Referring to FIG. 10, the operation of the embodiment in its ordinary recording mode is as follows: A video signal supplied to an input terminal 111 is processed by a signal processing circuit 112, for example, in the following manner: The brightness signal contained in the video signal is FM modulated while the chrominance signal contained in the video signal is converted to a low frequency and is supplied to a mixing circuit 113. Further, the signal processing circuit 112 extracts a vertical synchronizing signal $V_{SYNC}$ from the video signal and supplies it to the switch SW16. An oscillator 120 is arranged to produce pilot signals of four different frequencies f1′, f2′, f3′ and f4′ and to superpose these frequency signals f1′, f2′, f3′ and f4′ upon the field signal Accordingly, the signal 30 PG of 30 Hz as shown in FIG. 9 is obtained from the output terminal of the flip-flop 145.

Figure 11:
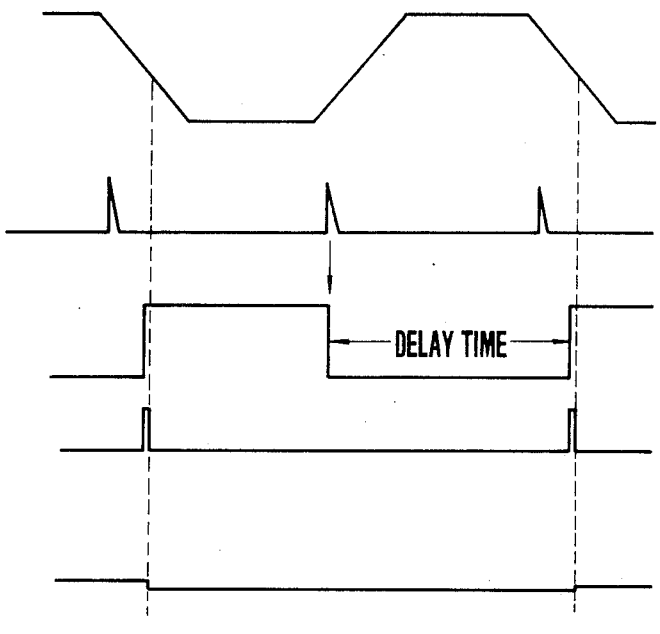
FIG. 11 is a timing chart showing the timing of control over the speed and phase of a drum motor used in the second embodiment.

The signal 30 PG is supplied to the oscillator 120 which produces the four frequency pilot signal. The frequency of the pilot signal is shifted every time the output of the flip-flop 145 is inverted. The wave form of the signal 30 PG is shaped into a keystone shape at a keystone wave-form shaping circuit 146. The keystone shaped wave is then supplied to a sample hold circuit 147. At the circuit 147, the keystone shaped wave form causes the vertical synchronizing signal $V_{SYNC}$ to be delayed at the monostable multivibrator 151 and is sample held by pulses the wave form of which is shaped by a wave form shaping circuit 152. The monostable multivibrator 151 is arranged to correct a phase difference between the signal 30 PG and the vertical synchronizing signal $V_{SYNC}$. A signal produced from the sample hold circuit 147 is supplied to a rotation control circuit 148 which is provided for control over the rotation of a drum motor 150. The rotation control circuit 148 is arranged to control a drum motor driving circuit 149 on the basis of the output of the circuit 147 and a signal from the drum motor 150 representing the rotating velocity of the motor. FIG. 11 is a time chart showing the operation of the phase control system for controlling the phase of the drum motor 150.

The following description explains a speed and phase control circuit for a capstan 138. A signal produced from a frequency oscillator 131 which is arranged to produce a signal representing the rotation velocity of the capstan 138 is converted into a pulse wave form at a wave form shaping circuit 139 and is supplied to a sample hold circuit 140. Meanwhile, a reference oscillator 142 produces an output which causes a keystone wave producing circuit 141 to form a keystone shaped wave. Then, a phase error signal is formed at the sample hold circuit 140 in the same manner as in the case of the drum motor. The velocity and phase of rotation of the capstan motor 138 are thus controlled by means of the phase error signal.

The operation of the embodiment in the reproduction mode is as follows: Both the switches SW11 and SW12 are connected to the side of their terminals P under the reproduction mode as indicated in the table shown above. The reproduced video signals from the heads 104 and 105 are respectively supplied to amplifiers 116 and 117 through transformers TR1 and TR2. The outputs of the amplifiers 116 and 117 are supplied to a signal processing circuit 118 via the switch SW13 which is arranged to shift its position from one connecting terminal to another according to the signal 30 PG. The signal processing circuit 118 performs a known process to produce a reproduced video signal to a terminal 119.

The reproduced signal from the switch SW13 is supplied to a low-pass filter 122 (hereinafter will be called LPF). The pilot signals of four frequencies are solely taken out from the LPF 122. The frequency characteristic of the pilot frequency band of the pilot signals is corrected at an equalizer circuit 123. The pilot signals are then applied to a multiplier 124. The multiplier 124 multiplies the output of the equalizer 123 with an output of an oscillator 120 obtained through an LPF 121. Through this process, signals of about 15 KHz and about 45 KHz are obtained as cross-talk signals coming from both tracks adjoining the reproducing track. Band-pass filters 125 and 126 extract these frequency signals of 15 KHz and 45 KHz. Further, detection circuits 127 and 128 carry out envelope detection. A difference between the outputs of the circuits 127 and 128 is amplified by a differential amplifier 129 to give an error signal representing the extent of tracking deviation. The directions of the difference frequencies 15 KHz and 45 KHz relative to both adjoining tracks are inverted for every field. The error signal and a signal obtained by inverting the error signal through an inversion amplifier 130 are connected to two terminals of a switch SW14. The position of the switch SW14 is shifted from one terminal to the other for every field according to the signal 30 PG to obtain thereby a tracking control signal ATF. The control signal ATF is applied through a switch SW15 to a phase control circuit 136 which is arranged to control the phase of the capstan motor. The capstan motor 138 is thus controlled by the control signal ATF to ensure accurate tracking for reproduction.

Meanwhile, the drum motor is controlled by the signal 30 PG and a signal from a reference oscillator 150 with a switch SW16 connected to its terminal PLAY.

The operation of the embodiment in the insertive recording mode is as follows: Since recording is performed in the video area during insertive recording as has already been described in the foregoing, the signal ATF cannot be obtained from the video area. Therefore, in this case, the signal ATF is obtained by switching the head which is scanning an area other than the video area to a reproducing state.

More specifically stated again referring to FIG. 8, the head 104 is in a reproducing mode at the parts T1, T2, t and T3. Meanwhile, the other head 105 is recording in the latter half of the video area TS'. As apparent from FIG. 8, the pilot signal reproduced from the head 104 at the overlapped area TP' is of frequency f3'. However, the amount of cross-talk varies with the above-stated parts. In other words, there is no cross-talk before the part T1. At the part T1, a cross-talk of f4' comes from the rear adjoining track while no cross-talk f2' comes from the front adjoining track. At the part T2, the cross-talk f2' from the front adjoining track gradually increases. At the part t, both the cross-talks f2' and f4' are reproduced as correct cross-talks. Further, at the part T3, the cross-talk f2' still comes from the front adjoining track. However, the cross-talk component from the rear adjoining track is no longer f4' but becomes f1' which is f3'−f1'=60 KHz and cannot be detected with the circuit arrangement of the present embodiment.

As shown in FIG. 9 as ATF output, the amounts of cross-talks from the front and rear adjoining tracks appear to be equal before the part T1 and there obtains an intermediate level. At the part T1, the absence of the cross-talk f2' renders the output level of the ATF low. At the part T2, the cross-talk f2' is gradually reproduced to bring the ATF output to a correct level in the middle point of the part T2. The correct ATF output is obtained throughout the part t. At the part T3, the cross-talk component f4' disappears leaving only the cross-talk f2' to render the level of the ATF output high. The ATF output is thus sampled at the part t under the insertive recording mode. Satisfactory insertive recording, therefore, can be accomplished without any tracking miss by controlling the capstan motor with the ATF output thus sampled until arrival of the next part. Then, the end of the signal recorded by insertive recording can be satisfactorily connected to the track of the existing record.

Referring to FIG. 8, while the head 104 is reproducing a recorded signal in an area other than the video area, the head 105 is performing recording within the video area TS'. In this instance, the switch SW11 is in connection with its terminal P, the switch SW12 in connection with its terminal R and the switch SW13 in connection with its terminal (1). Then, another switch SW14 has been shifted to its terminal (−) to supply the ATF output to the sample hold circuit 135. Meanwhile, the output of a hole element 109 which is used for the control over the speed and phase of the motor 150 is shaped by a wave-form shaping circuit 132 and is delayed by a monostable multivibrator 133 to produce a timing signal for the period of the above-stated part t. The output of the monostable multivibrator 133 is shaped into the form of sampling pulses by a pulse generator 134 and then is supplied to a sample hold circuit 135. At that time, a switch SW15 is in connection with its terminal INS to allow the output of the sample hold circuit 135 to be supplied to a motor control circuit 136 and the capstan motor 138 is controlled thereby. In the insertive recording mode, as apparent from FIG. 8, the frequency of the pilot signal impressed on the multiplier 124 for the purpose of obtaining a tracking control signal is equal to that of the pilot signal impressed on the mixing circuit 113. This arrangement, therefore, obviates the necessity of use of another oscillator.

Referring to FIG. 9 which is a timing chart showing the operation of the embodiment in the insertive recording mode, the level of the ATF output would become high during the period from the part T2 to the part t if the tape phase is delayed by some reason. In view of this, the ATF output is sampled and held within the period of the part t and a voltage which is higher than ordinary voltage is impressed to the capstan motor according to the sample hold output thus obtained. This action compensates for the delay of tape phase to effectively prevent tracking deviation. Further, since the tracking control signal is obtained during the period t, the tracking control signal is stable.

In the first and second examples embodying the invention which have been described in the foregoing, the pilot signal is arranged to be recorded over the whole area of each recording track.

These embodiments are not applicable in cases where the pilot signal is arranged in an intermittent manner and cannot be reproduced during the overlapped period. A third embodiment of example which is applicable to such arrangement is as explained below:

In the third embodiment, the tracking control signal for insertive recording is arranged to be recorded beforehand in a simple manner during a recording operation. This method enables an ordinary pilot signal reproducing procedure to be applicable to any system. It, therefore, enables an existing system to accomplish insertive recording through simple modification. Besides, tracking control for reproduction can be carried out solely with the pilot signal of this embodiment example.

Figure 12:
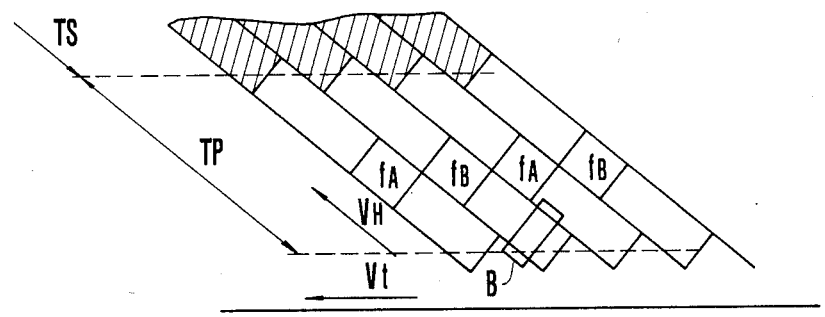
FIG. 12 is a schematic illustration showing the recording pattern of the overlapped portion of a recording tape used on a third embodiment of the invention.

FIG. 12 is an enlarged view of a tape pattern corresponding to an overlapping part (TP) located on the entrance side of the drum. In the third embodiment of the invention, pilot signals of different frequencies are superposed within 1 H (horizontal scanning) periods of the same height relative to the direction of the tape in the overlapping portion for every field as shown in FIG. 12. The method for recording the pilot signal is not essential to the present invention and, therefore, is omitted from description here. During insertive recording, a total of 3 H periods including the 1 H period in which the pilot signal is recorded and front and rear 1 H periods are switched over to the reproduction mode in the same manner as in the first embodiment. With the 3 H periods shifted to the reproduction mode, a reproduced RF signal for the 3 H periods is produced to the output terminal of the switching circuit 40 as shown in the block diagram of FIG. 3. Assuming that the above-stated pilot signal is considered to be signals fA and fB corresponding to the fields A and B, the frequencies of the signals fA and fB are arranged to be of a low frequency value of about 200 KHz when reproduced by an azimuth head as cross-talks from adjoining tracks even in azimuth recording.

Figure 13:
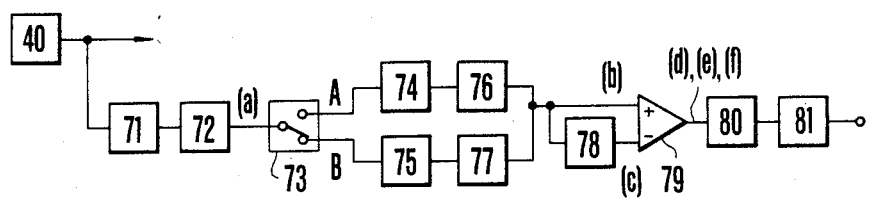
FIG. 13 is a circuit block diagram showing in particular the circuit arrangement of a portion of the third embodiment differing from the first embodiment.

In the block diagram of FIG. 13, the RF signal which is reproduced is processed through a low-pass filter 71 to remove its high frequency component such as a picture signal, etc. After that, the signal is amplified by an amplifier 72. Then, the output thus obtained is switched by a switch 73 for every field. The switching operation of the switch 73 is accomplished by means of the above-stated switching pulses in such a way as to bring it to its side A when the rotary head A (4) is on the side of the entrance of the drum and to its side B when the head is at the drum entrance overlapping portion TD. Reference numerals 74 and 75 indicate band-pass filters which have frequencies fB and fA as their central frequencies; and 76 and 77 indicate amplitude detectors for detecting the amplitude of the signals fB and fA. The outputs of these detectors are supplied directly to the positive side of a differential amplifier 79 and also to the negative side thereof through a 2 H delay line 78 which delays the output by the period of 2 H. The output of the differential amplifier 79 is gated during a period of 1 H during which the pilot signal is being inserted and next 2 H periods and is then produced to a hold circuit 81.

The third embodiment is further explained with reference to the timing chart of FIG. 14. In FIG. 14, a part (a) represents pilot signals produced from the amplifier 72. Of these pilot signals, a pilot signal which is not a cross-talk component and is contained in the reproducing track (or a pilot signal fA in the case of the head A) is removed through either the band-pass filter 74 or the filter 75. A signal which comes to the positive side of the differential amplifier 79 becomes an error signal (b) representative of a leftward deviation and a signal which comes to the negative side of the differential amplifier 79 via the 2 H delay line 78 becomes an error signal (c) representative of a rightward deviation. They are produced from the amplifier 79 as capstan phase error signals and are gated and produced to the capstan control system within a period of 3 H as mentioned in the foregoing.

In FIG. 14, a graph (d) represents the output of the differential amplifier 79 showing portions G. The range of each of the portions G represents a gating period by the gate 80. The graphs (e) and (f) of FIG. 14 respectively show error voltages which are produced when the leftward or rightward deviation of tracking takes place.

The above-stated gate 80 and the hold circuit 81 may be replaced with an integrator. In this particular embodiment, the recording period for the pilot signals of frequencies fA and fB is 1 H. However, this period may be arranged to be more than 1 H.

In the first, second and third embodiments, use of two video heads has been described by way of example. However, the invention is of course applicable to other systems where three or more heads are to be used. Further, in the examples given, a video signal is arranged to be recorded and reproduced as an information signal. However, the invention is not limited to such a system but is also applicable to systems for recording and reproducing an audio signal, data signal, etc.

In accordance with the invention, tracking control can be accurately carried out not only for ordinary reproduction but also for insertive recording with a relatively simple circuit arrangement and without necessitating use of a CTL head as will be clearly understood from the foregoing description.

While preferred embodiments of the invention have been described, various modifications and changes will occur to those skilled in the art within the scope of the present inventive concepts which are delineated by the following claims.

What we claim is:

1. An information signal recording and reproducing apparatus, comprising:
   (a) first means for forming, in turn, a number of tracks arranged in parallel on a recording medium and recording an information signal and a tracking control pilot signal on a first area of each track and recording said pilot signal on a second area of the same track;
   (b) second means for concurrently reproducing said information signal and pilot signal from said first area; and
   (c) third means for reproducing said pilot signal from the second area and at the same time recording the information signal on the first area.

2. An apparatus according to claim 1, further comprising:
   moving means for moving said recording medium in a direction crossing said tracks; and
   control means for controlling the action of moving said recording medium with said moving means by utilizing said pilot signal reproduced from said recording medium.

3. An apparatus according to claim 2, wherein said tracking control pilot signal includes signals having four kinds of frequencies different from each other, and said signals are recorded cyclically in turn in a predetermined order for each one of the tracks.

4. An information signal recording and reproducing apparatus, comprising:
   (a) transducing means for tracing, in turn, a number of tracks arranged in parallel to each other on a tape-shaped recording medium and in a direction crossing the lengthwise direction of said medium to recording and reproducing an information signal and/or a tracking control pilot signal;
   (b) first control means for having said transducing means perform a recording on a first area of the medium and having said transducing means perform a reproduction from a second area of the recording medium, said first and second areas being formed respectively in the lengthwise direction of said tape-shaped recording medium;
   (c) second control means for having said transducing means perform a reproduction from said first area;
   (d) tracking control means for controlling relative positional relationship between one of said tracks and said transducing means by utilizing said pilot signal reproduced by said transducing means; and
   (e) changeover means for changing over the pilot signal used in said tracking control means between the pilot signal reproduced from said first area and the pilot signal reproduced from said second area, said changeover means functioning so that the tracking control means uses the pilot signal reproduced from the second area when said transducing means is controlled by said first control means, and said changeover means serving for effecting a changeover that said tracking control means uses the pilot signal reproduced from the first area when said transducing is controlled by said second control means.

5. An information signal recording and reproducing apparatus, comprising:
   (a) transducing means for tracing, in turn, a number of tracks being arranged in parallel to each other on a tape-shaped recording medium and in a direction crossing the longitudinal direction of said medium, thus recording and reproducing an information signal and/or a tracking control pilot signal;
   (b) first control means for controlling said transducing means so as to prevent a reproduction from a first area of the medium but to effect a reproduction from a second area of the medium, said first and second areas being respectively formed lengthwise of said tape-shaped recording medium;
   (c) second control means for controlling said transducing means so as to effect a reproduction both from the first area and from the second area;
   (d) tracking control means for controlling a relative positional relationship between one of said tracks and said transducing means by utilizing the pilot signal reproduced by the transducing means; and
   (e) changeover means for changing over the pilot signal used in said tracking control means between the pilot signal reproduced from the first area and the pilot signal reproduced from the second area, said changeover means serving to function so that said tracking control means uses the pilot signal reproduced from the second area when said transducing means is controlled by said first control means, and that said tracking control means uses the pilot signal reproduced from said first area when said transducing means is controlled by said second control means.

6. An information signal recording and reproducing apparatus, comprising:
   (a) transducing means including a rotary head which traces, in turn, a number of tracks arranged in parallel to each other on a tape-shaped recording medium and in a direction corssing a lengthwise direction of said medium, and effects a recording and a reproduction of an information signal and/or a tracking control pilot signal, said rotary head crossing a first rotary area and a second rotary area respectively formed in the lengthwise direciton of said tape-shaped recording medium during one rotation thereof;
   (b) tracking control means for controlling relative positional relationships between the tape-shaped recording medium and the transducing means by using said pilot signal reproduced by said transducing means; and
   (c) changeover means for changing the pilot signal used in said tracking control means between the pilot signal reproduced while said rotary head is tracking said first and the pilot signal reproduced while said rotary head is tracing said second area.

7. An apparatus according to claim 6, wherein said tracking control pilot signal includes signals having four kinds of frequencies different from each other, and said signals are cyclically recorded and reproduced in turn at each track in a predetermined order at said first area and said second area.

8. An information signal recording and reproducing apparatus, comprising:
   (a) transducing means including first and second rotary heads which in turn trace on tracks being arranged in parallel to each other on a tape-shaped recording medium and in a direction crossing the lengthwise direction of said medium and make a recording and a reproduction of an information signal and/or a tracking control pilot signal;

(b) first control means for controlling said transducing means so that the first rotary head is placed in a recording state and the second rotary head is placed in a reproducing state when said first and second rotary heads are both tracing the recording medium;

(c) second control means for controlling said transducing means so that the first rotary head is placed in the reproducing state and the second rotary head is also placed in the reproducing state when said first and second rotary heads are both tracing the recording medium;

(d) tracking control means for controlling a relative positional relationship between one of said tracks and said transducing means by using the pilot signal reproduced by said transducing means; and (e) changeover means for changing over the pilot signal used in said tracking control means between the pilot signal reproduced from said first head and the pilot signal reproduced from said second head, said changeover means derving to function so that said tracking control means uses the pilot signal reproduced by said second head when the transducing means is controlled by said first control means, and said changeover means effecting the changeover so that said tracking control means uses the pilot signal reproduced by said first head when said transducing means is controlled by said second control means.

9. An information signal recording and reproducing apparatus, comprising:

(a) transducing means including first and second rotary heads which in turn trace on a number of tracks being arranged in parallel to each other on a tape-shaped recording medium and in the lengthwise direction of said medium and effect a recording and a reproduction of an information signal and/or a tracking control pilot signal;

(b) first control means for controlling said transducing means so that the first rotary head is prevented from effecting a reproduction and the second rotary head is made to effect the reproduction when said first and second rotary heads are both tracing on the recording medium;

(c) second control means for controlling said transducing means so that the first rotary head and the second rotary heads are both made to effect the reproduction when said first and second rotary heads are both tracing on the recording medium;

(d) tracking control means for controlling a relative positional relationship between one of said tracks and said transducing means by using said pilot signal reproduced by said transducing means; and (e) changeover means for changing over the pilot signal used in said tracking control means between the pilot signal reproduced from said first head and the pilot signal reproduced from said second head, said changeover means being arranged to function so that said tracking control means uses the pilot signal reproduced by said second head when said transducing means is controlled by said first control means; and said changeover means effecting the changeover so that said tracking control means uses the pilot signal reproduced by said first head when said transducing means is controlled by said second control means.

10. An information signal recording and reproducing apparatus, comprising:

(a) transducing means for tracing, in turn, a number of tracks being arranged in parallel to each other on a tape-shaped recording medium and in a direction crossing with the lengthwise direction of said medium, thus recording and reproducing an information signal and/or tracking control pilot signal;

(b) first control means for controlling said transducing means so that said information signal and said pilot signal are recorded on a first area of the medium and said pilot signal is recorded on a second area of the medium, wherein said first and second areas are formed respectively in the lengthwise direction of said tape-shaped recording medium;

(c) a second control means for controlling said transducing means so that said information signal and said pilot signal are reproduced from said first area;

(d) third control means for controlling said transducing means so that said information signal is recorded on said first area and said pilot signal is reproduced from said second area;

(e) moving means for moving said tape-shaped recording medium in the lengthwise direction thereof;

(f) detecting means for detecting a relative positional relationship between one of said tracks and said transducing means;

(g) moving control means for controlling the moving operation by said moving means of the recording medium; and (h) changeover means for changing over said moving control means between a condition using an output signal of said detecting means and a condition not using the same, said changeover means effecting the changeover in such a manner that when said transducing means is controlled by said first control means said moving control means does not use the output signal of said detecting means, and when said transducing means is controlled by said second control means and when it is controlled by said third control means said moving control means uses the output signal of said detecting means.

11. An apparatus according to claim 10, wherein said moving control means includes a speed control circuit for controlling a moving speed of said medium by said moving means and a phase control circuit for controlling a moving phase of said medium, and said changeover means functions to effect a changeover between a condition using the output signal of said detecting means at said phase control circuit and a condition not using the same.

12. An apparatus according to claim 9, further comprising generating means for generating a phase control signal for said phase control means to secure a predetermined phase in moving said medium.

13. An apparatus according to claim 11, wherein said changeover means includes a switching circuit for selectively producing said phase control signal and the output signal of said detecting means.

14. An apparatus according to claim 10, wherein said tracking control pilot signal includes signals for four frequencies different from each other and said signals are cyclically recorded and reproduced in turn on or from each track in a predetermined order.

15. An information signal recording and reproducing apparatus, comprising:
  (a) transducing means for tracing, in turn, a number of tracks being arranged in parallel to each other on a tape-shaped recording medium and in a direction crossing the lengthwise direction of said medium thus recording and reproducing an information signal and/or a tracking control pilot signal;
  (b) first control means for controlling said transducing means so that a recording is made on a first area of the medium and a reproduction is made from a second area of the medium, wherein said first and second areas are respectively formed in the lengthwise direction of said tape-shaped recording medium;
  (c) second control means for controlling said transducing means so that a recording is made on said first area and a reproduction is not made from said second area;
  (d) moving means for moving said tape-shaped recording medium in the lengthwise direction thereof;
  (e) detecting means for detecting a relative positional relationship between one of said tracks and said transducing means by using the pilot signal reproduced by said transducing means;
  (f) moving control means for controlling the moving operation by said moving means of the recording medium; and
  (g) changeover means for changing over said moving control means between a state of using an output signal of said detecting means and a state of not using the same, said changeover means effecting the changeover in such manner that
  when said transducing means is controlled by said first control means said moving control means uses an output signal of said detecting means, and
  when said transducing means is controlled by said second control means said moving control means does not use the output signal of said detecting means.

16. An apparatus according to claim 13, wherein said moving control means includes a speed control circuit for controlling a moving speed of said medium by said moving means and a phase control circuit for controlling a moving phase of said medium, and said changeover means functions so as to effect a changeover between a state using the output signal of said detecting means at said phase control circuit and a state not using the same.

17. An apparatus according to claim 15, wherein said transducing means traces said second area on the recording medium before it traces the first area.

18. An information signal recording and reproducing apparatus, comprising:
  (a) transducing means including first and second rotary heads which trace, in turn, on a number of tracks arranged in parallel to each other on a tape-shaped recording medium and in the lengthwise direction of said medium and effect a recording and a reproduction of an information signal and/or a tracking control pilot signal;
  (b) first control means for so controlling said transducing means that when said first and second rotary heads are both tracing said recording medium the first rotary head is made to effect the recording and the second rotary head is made to effect the reproduction;
  (c) second control means for so controlling said transducing means that when said first and second rotary heads are both tracing the recording medium said first rotary head is made to effect the recording but said second rotary is made not to effect the reproduction;
  (d) moving means for moving said tape-shaped recording medium in the lengthwise direction thereof;
  (e) detecting means for detecting a relative positional relationship between one of said tracks and said transducing means by using the pilot signal reproduced by said transducing means;
  (f) moving control means for controlling the moving operation by said moving means of the recording medium; and
  (g) changeover means for changing over said moving control means between a state using an output signal of said detecting means and a state not using the same, said changeover means effecting the changeover such that
  when said transducing means is controlled by said first control means said moving control means uses an output signal of said detecting means, and
  when said transducing means is controlled by said second control means said moving control means does not use the output signal of said detecting means.

19. An apparatus according to claim 18, wherein said first rotary head and said second rotary head rotate virtually on a single locus with a phase difference of 180°.

* * * * *